(12) United States Patent
Broers et al.

(10) Patent No.: US 9,801,258 B2
(45) Date of Patent: Oct. 24, 2017

(54) MULTI-MODAL SENSING

(71) Applicant: PHILIPS LIGHTING HOLDING B.V., Eindhoven (NL)

(72) Inventors: Harry Broers, S-Hertogenbosch (NL); Ruben Rajagopalan, Neuss (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/127,375

(22) PCT Filed: Mar. 6, 2015

(86) PCT No.: PCT/EP2015/054735
§ 371 (c)(1),
(2) Date: Sep. 19, 2016

(87) PCT Pub. No.: WO2015/139971
PCT Pub. Date: Sep. 24, 2015

(65) Prior Publication Data
US 2017/0135180 A1    May 11, 2017

(30) Foreign Application Priority Data

Mar. 19, 2014 (EP) .................................... 14160623

(51) Int. Cl.
*H05B 37/00* (2006.01)
*H05B 37/02* (2006.01)

(52) U.S. Cl.
CPC ................. *H05B 37/0227* (2013.01)

(58) Field of Classification Search
CPC ... H04L 67/12; H04L 12/2827; H04L 63/101; H04L 67/22; H04L 67/34; H04L 12/282; H04L 1/189; H04L 2001/0093; H04L 2012/2841; H04L 2012/2849; H04L 29/06027; H04L 41/0803; H04L 41/12; H04L 45/06
See application file for complete search history.

(56) References Cited

U.S. PATENT DOCUMENTS

2005/0134548 A1    6/2005  Kim et al.
2009/0058315 A1    3/2009  Baeumle
(Continued)

FOREIGN PATENT DOCUMENTS

CN    201263238 Y    6/2009
JP    2004198411 A    7/2004
(Continued)

*Primary Examiner* — Monica C King
(74) *Attorney, Agent, or Firm* — Meenakshy Chakravorty

(57) ABSTRACT

A controller comprising: an output for controlling lighting device(s)to illuminate an environment; an input for receiving a signal output from a sensor of a first type and a sensor of a second type, wherein the sensor of the second type consumes more power, but provides more accurate motion detection than the sensor of the first type; and a control module configured to detect motion of objects in the environment in response to receiving at least one of the signals, and control the lighting device(s) based on detected motion of objects. The control module configured to disable the sensor of the second type, and use the sensor of the first type to detect motion of objects when higher traffic density of objects passing through the environment occurs, and use at least the sensor of the second type to detect motion of objects when lower traffic density of objects occurs.

15 Claims, 3 Drawing Sheets

(56) References Cited

U.S. PATENT DOCUMENTS

| | | |
|---|---|---|
| 2009/0229190 A1 | 9/2009 | Daniel-Wayman et al. |
| 2009/0289793 A1 | 11/2009 | Morin |
| 2011/0022189 A1 | 1/2011 | Perry |
| 2011/0037417 A1 | 2/2011 | Mix et al. |
| 2011/0043503 A1 | 2/2011 | Hadwen |
| 2012/0092192 A1 | 4/2012 | Wong |
| 2012/0153868 A1 | 6/2012 | Gu et al. |
| 2012/0326611 A1 | 12/2012 | Nanahara et al. |
| 2013/0022508 A1 | 1/2013 | Leboeuf et al. |
| 2013/0151135 A1 | 6/2013 | Aubrey et al. |
| 2013/0241420 A1 | 9/2013 | Kercso et al. |

FOREIGN PATENT DOCUMENTS

| | | | |
|---|---|---|---|
| JP | 2006270865 A | 10/2006 | |
| JP | 2010052527 A | 3/2010 | |
| JP | 2014501020 A1 | 1/2014 | |

MULTI-MODAL SENSING

CROSS-REFERENCE TO PRIOR APPLICATIONS

This application is the U.S. National Phase application under 35 U.S.C. §371 of International Application No. PCT/EP2015/054735, filed on Mar. 6, 2015, which claims the benefit of European Patent Application No. 14160623.6, filed on Mar. 19, 2014. These applications are hereby incorporated by reference herein.

TECHNICAL FIELD

The present disclosure relates generally to motion sensors, and in particular to motion sensors for use in presence-based lighting control.

BACKGROUND

In current lighting applications, energy efficiency is a more and more important subject. One possible way to reduce the energy consumption of a lighting system is to switch off or dim one or more light sources thereof when no object (i.e. person or vehicle) is present in a space, and conversely to switch on the light(s) when an object moves into the space. In order to do this, the presence of an object in the relevant space has to be detected. Different types of motion sensors are currently in use.

There is a strong need for sensor-driven light control systems, because of their advantage of bringing down the energy consumption of the light source(s) thereof, and thereby improving cost-savings, and life-time of the light source(s).

In a typical sensor driven light control infrastructure a multitude of motion sensors (Passive Infra-Red (PIR) sensors, Image sensors, Radar sensors, etc.) are typically installed in the lighting infrastructure for various sensing requirements. These sensors are capable of similar sensing functionalities but at different levels of accuracy/robustness, and also consume different levels of energy/power. For example, known image sensors are capable of processing captured images to differentiate between different kinds of sensed motion, e.g., between a passing cyclist and a tree blowing in the wind. Thus such a motion sensor can be used to infer the absence of vehicles, cyclists and/or pedestrians, and dim-down luminaires accordingly, even in the presence of other types of sensed motion. However, this high level of accuracy comes at a cost. In particular image sensors typically consume more energy than other types of motion sensor. For instance, an image sensor consumes more energy than an ultrasonic sensor, which in turn consumes more energy than a PIR sensor.

In traffic density (object count over time) based lighting applications, known solutions use a less accurate and more energy efficient sensor to detect objects during periods of lower traffic density and use a more accurate and less energy efficient sensor to detect objects during periods of higher traffic density.

SUMMARY

The inventors have recognised that because luminaires of a lighting system will typically remain dimmed-up during periods of high traffic density, false-triggers or missed detections which are associated with less accurate sensors have little or no negative effect on the lighting system, and that therefore the more accurate sensors can be deactivated (or put in sleep mode) to save energy. On the other hand, during periods of low traffic density, false-triggers may cause luminaires to dim-up unnecessarily, thereby wasting energy and justify the use of the more accurate sensors.

Thus in embodiments of the present disclosure, the more accurate but less energy efficient sensor(s) are only activated in periods when robust system performance is required/preferred.

According to one aspect of the present disclosure there is provided a controller comprising: an output for controlling one or more lighting device to illuminate an environment; an input for receiving a signal output from a sensor of a first type and a signal output from a sensor of a second type, wherein the sensor of the second type consumes more power than the sensor of the first type; and a control module configured to detect motion of objects in said environment in response to receiving at least one of said signals, and control the one or more lighting device based on detected motion of objects in said environment, wherein the signal output from the sensor of the second type provides more accurate motion detection than the signal output from the sensor of the first type; and wherein the control module is configured to disable the sensor of the second type, and use the signal received from the sensor of the first type to detect motion of objects in said environment when higher traffic density of objects passing through said environment occurs, and use the signal received from at least the sensor of the second type to detect motion of objects in said environment when lower traffic density of objects passing through said environment occurs.

The control module may be configured to dynamically determine the traffic density of objects passing through the environment.

The control module may be configured to use the signal received from only the sensor of the second type to detect motion of objects in the environment when lower traffic density of objects passing through the environment occurs.

When lower traffic density of objects passing through the environment occurs, the control module may configured to use the signal received from the sensor of the second type to detect motion of objects in the environment, and use the signal received from the sensor of the first type to verify the detection of the sensor of the second type.

The control module may be configured to determine the traffic density of objects passing through the environment based on a count of a number of the objects detected within a predetermined time period.

The control module may be configured to: determine when higher traffic density of objects passing through the environment occurs when the count is equal to, or greater than, a predetermined traffic density threshold; and determine when lower traffic density of objects passing through the environment occurs when the count is less than the predetermined traffic density threshold.

Alternatively, the control module may be configured to determine when higher traffic density and lower traffic density of objects passing through the environment occurs based on received time of day information.

In exemplary embodiments, the control module is configured to control an illumination level of light emitted from the one or more lighting device in dependence on the determined traffic density.

The control module may be configured to proportionally control the illumination level of light emitted from the one or more lighting device in dependence on the determined traffic density.

According to a further aspect, there is provided a lighting system comprising: the controller referred to above, at least one sensor; and the one or more lighting device.

The at least one sensor may comprise a first sensor of the first type and a second sensor of the second type, wherein the first and second sensor are separate sensor units. The first sensor may comprise at least one Passive Infra-Red sensor and the second sensor may comprise at least one image sensor.

The at least one sensor may comprise a single sensor, the single sensor configured to switch between operating as the sensor of the first type and the sensor of the second type in dependence on its operating mode.

The single sensor may comprise a time of flight sensor, wherein the time of flight sensor is configured to operate as the sensor of the first type in a first operating mode wherein the time of flight sensor performs passive image sensing, and operate as the sensor of the second type in a second operating mode wherein the time of flight sensor performs active time-of-flight based image sensing.

According to a further aspect, there is provided a computer program product for performing sensing using a signal output from a sensor of a first type and a signal output from a sensor of a second type to control one or more lighting device to illuminate an environment, the computer program product comprising code embodied on a computer-readable medium and being configured so as when executed on a processor to: detect motion of objects in said environment in response to receiving at least one of said signals, and control the one or more lighting device based on detected motion of objects in said environment, wherein the signal output from the sensor of the second type provides more accurate motion detection than the signal output from the sensor of the first type; disable the sensor of the second type, and use the signal received from the sensor of the first type to detect motion of objects in said environment when higher traffic density of objects passing through said environment occurs; and use the signal received from at least the sensor of the second type to detect motion of objects in said environment when lower traffic density of objects passing through said environment occurs.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Figure 1:
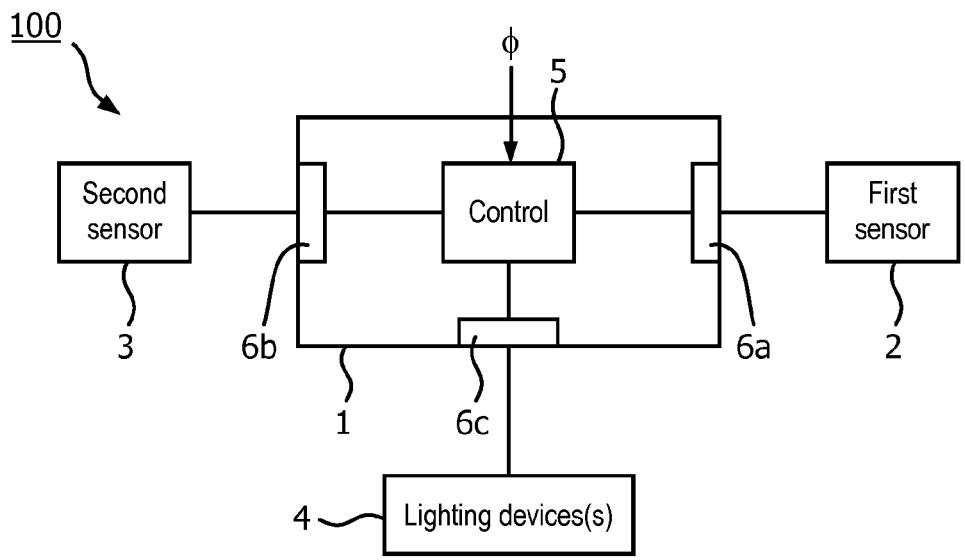
FIG. 1 is a schematic block diagram of a lighting system.

Reference is first made to FIG. 1 which illustrates a schematic block diagram of a lighting system 100.

The lighting system 100 comprises a controller 1 coupled to a first sensor 2, a second sensor 3, and one or more lighting devices 4 in the form of one or more luminaires operable to emit light to illuminate an environment of the lighting system 100. A luminaire of the one or more lighting devices 4 comprises at least one light source for providing illumination. The at least one light source may comprise any suitable source of light such as e.g. a high/low pressure gas discharge source, a laser diode, an inorganic/organic light emitting diode (LED), an incandescent source, or a halogen source. The light source may be a single light source, or could comprise multiple light sources, e.g. multiple LEDs which may, for example, form an array of light sources collectively operating as a single light source.

The first sensor 2 and the second sensor 3 have different sensing modalities. That is, the first sensor 2 and the second sensor 3 have different power consumption and motion detection characteristics. In particular, the second sensor 3 consumes more power than the first sensor 2; however the second sensor 3 provides more accurate motion detection of objects in the environment of the lighting system 100 than the first sensor 2.

For example, the first sensor 2 may comprise a PIR sensor, in which case the second sensor 3 may comprise for example an active sensor which transmits a probing waveform and then uses a reflection of that waveform received back at the sensor to detect movement. Examples of active sensors include ultrasonic, radio (e.g. radar) and microwave sensors which emit pulses of ultrasonic, radio frequency (RF) or microwave radiation respectively and detect motion based on the reflection thereof. The second sensor 3 may alternatively comprise an image sensor, for example a CMOS (complementary metal oxide semiconductor) image sensor, a CCD (charge coupled device) image sensor, or a 3D range sensor.

Whilst the first sensor 2 is shown as a single sensor in FIG. 1, the first sensor 2 may comprise two or more sensors of the same modality. Similarly, whilst the second sensor 3 is shown as a single sensor in FIG. 1, the second sensor 3 may comprise two or more sensors of the same modality.

The controller 1 comprises a control module 5 which is coupled to the first sensor 2 via a first interface 6a and to the second sensor 3 via a second interface 6b. Whilst FIG. 1 shows separate interfaces for each sensor, it will be appreciated that the control module 5 may be coupled to both the first sensor 2 and the second sensor 3 via a single interface of the controller 1.

Figure 2:
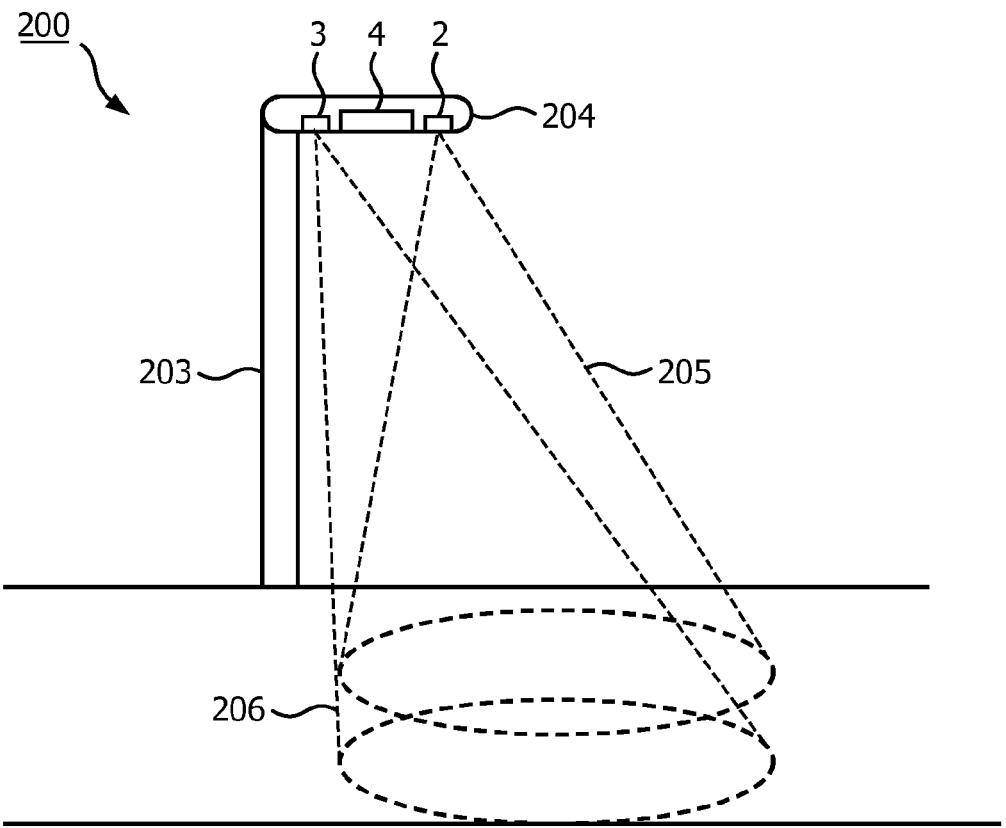
FIG. 2 illustrates an outdoor street light comprising the lighting system.

The control module 5 is configured to receive a signal output from the first sensor 2 via the first interface 6a and detect motion of an object in a sensing region (SR) 205 as shown in FIG. 2 (often referred to as a field of view (FOV)) of the first sensor 2 based on receiving this signal. Similarly, the control module 5 is configured to receive a signal output from the second sensor 3 via interface 6b and detect motion of an object in a SR 206 of the second sensor 3 based on receiving this signal, as shown in FIG. 2. The control module 5 is able to enable and disable the first sensor 2 by transmitting appropriate control signals to the first sensor 2 via interface 6a. The control module 5 is able to enable and disable the second sensor 3 by transmitting appropriate control signals to the second sensor 3 via interface 6b.

When a sensor (e.g. the first or second sensor) is enabled the sensor is operable to detect motion of an object in its SR. Furthermore the control module 5 is able to detect motion of an object in the SR of the sensor when the sensor is enabled. When enabled, the sensor may be configured to continually output a signal to the controller 1 which the control module 5 can use to detect motion of an object in the SR of the sensor; alternatively the sensor may be configured to only output a signal to the controller 1 when the sensor detects motion of an object in the SR of the sensor. When a sensor is enabled the sensor consumes power from its power source (not shown in FIG. 1). As described above, when the second sensor 3 is enabled it consumes more power than when the first sensor 2 is enabled. In contrast, when a sensor (e.g. the first or second sensor) is disabled the sensor is not operable to detect motion of an object in its sensing region. That is, the control module 5 is not able to detect motion of an object in the SR of the sensor when the sensor is disabled. When disabled, the sensor does not output any signal to the controller 1 and does not consume any power from its power source or consumes a minimal amount of power from its power source (for example the sensor may be put in a sleep mode when disabled).

The controller 1 is configured to control the amount of light emitted from the luminaire(s) 4 by transmitting appropriate control signals to the luminaire(s) via interface 6b. The functionality of the controller 1 may be implemented in code (software) stored on a memory comprising one or more storage media, and arranged for execution on a processor comprising on or more processing units. The code is configured so as when fetched from the memory and executed on the processor to perform operations in line with embodiments discussed below. Alternatively it is not excluded that some or all of the functionality of the controller 1 is implemented in dedicated hardware circuitry, or configurable hardware circuitry like a field-programmable gate array (FPGA).

One or more of the controller 1, first sensor 2, and the second sensor 3 may be integrated within the luminaire(s) 4. Alternatively one or more of the controller 1, first sensor 2, and the second sensor 3 may be housed in one or more separate units to the luminaire(s) 4 but otherwise electrically coupled to the luminaire(s) 4.

The lighting system 100 may be placed in an environment comprising an indoor space such as an office, an interior space within a home, a laboratory, shopping mall etc. or an outdoor space such as a marquee, garden, park etc.

FIG. 2 illustrates the SR 205 of the first sensor 2 and the SR 206 of the second sensor 3 when the lighting system 100 is implemented in a portion 204 of an outdoor street light 200 suitable for lighting car parks and roads etc. The light footprint of the light emitted from the luminaire(s) 4 is not shown in FIG. 2. It will be appreciated that whilst embodiments are described with reference to this particular application for illustration purposes, embodiments are not limited to outdoor lighting environments and principles of the present disclosure may also extended to indoor lighting environments.

Both the first sensor 2 and the second sensor 3 are arranged to generate presence-related information from their respective SR, e.g. corresponding to an area on the floor or a three dimensional volume. The SR may be defined in part by the range of the sensor. The respective SRs of the first sensor 2 and the second sensor 3 may partially overlap as shown in FIG. 2. Alternatively, a SR of one of the first sensor 2 and the second sensor 3 may completely overlap with the SR of the other sensor, or the respective SRs of the first sensor 2 and the second sensor 3 may not overlap at all.

Whilst FIG. 2 illustrates the first sensor 2 and the second sensor 3 being integrated in the portion 204 of the outdoor street light 200, one or more of the first sensor 2 and the second sensor 3 may be housed in a unit (or separate units) coupled to a lighting pole 203 of the outdoor street light 200.

Figure 3:
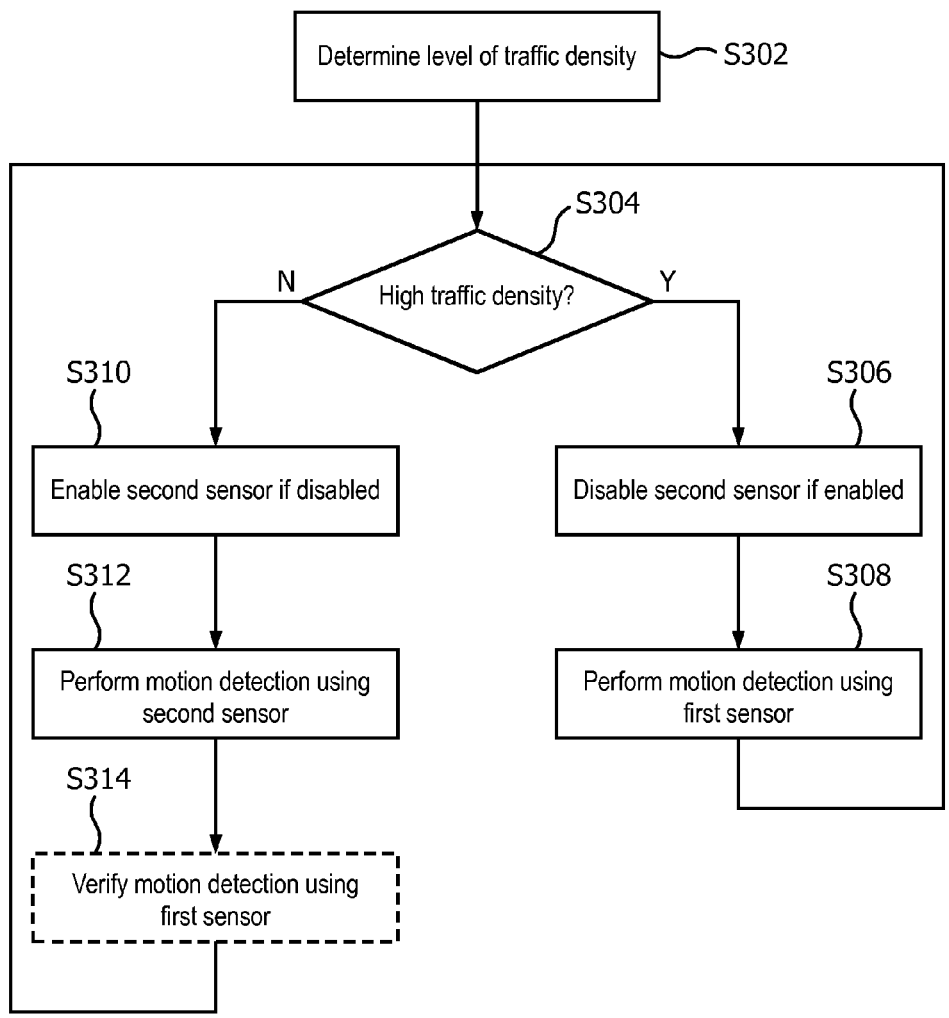
FIG. 3 is a flow chart of a method to control lighting devices of the lighting system.

Reference is now made to FIG. 3 which illustrates a process 300 performed by the control module 5 in accordance with embodiments of the present disclosure.

At step S302, an initial step of determining the traffic density of objects passing through the environment of the lighting system 100 is performed by the control module 5.

In one embodiment, the control module 5 may perform step S302 by using the signal received from the first sensor 2 and/or the second sensor 3 to count the number of detected objects that have passed through the environment of the lighting system 100 within a predetermined time period.

In this embodiment, at step S304 the control module 5 determines whether there is a high traffic density of objects passing through the environment by comparing the determined traffic density to a predetermined threshold traffic density threshold ($D_{th}$). If the determined traffic density is equal to or greater than the threshold traffic density the control module 5 determines that that there is high traffic density, otherwise the control module 5 determines that that there is low traffic density. The predetermined threshold traffic density threshold, $D_{th}$, may be configurable according the particular application and environment of the lighting system 100.

In another embodiment, the control module 5 may perform steps S302 and S304 based on the time of day. In this embodiment, an external scheduler associates one or more time periods during a day (e.g. 6 am-9 am and 4 pm-7 pm) with higher traffic density and associate one or more other time periods during the day with lower traffic density (e.g. 9 am-4 pm and 7 pm-6 am). The external scheduler outputs a signal (denoted $\phi$ in FIG. 1) at a level in dependence on the time of day. The control module 5 is configured to determine when higher traffic density and lower traffic density of objects passing through the environment occurs based on receiving the signal $\phi$ from the external scheduler.

Alternatively, the control module 5 may be configured to determine the time of day based on a timer (not shown in FIG. 1). The timer may be an internal component of the controller 1 in which case it may be an internal or external module of the control module 5. Alternatively the timer may be external to the controller 1. Upon receiving time of day information from the timer, the control module 5 may compare the time of day to a one or more configurable windows of time (that are associated with either low or high traffic density) to determine whether there is a high traffic density of objects passing through the environment.

If the control module 5 determines at step S304 that there is high traffic density then the process 300 proceeds to step S306, otherwise the process 300 proceeds to step S310.

At step S306, the control module 5 transmits a control signal to the second sensor 3 to disable the second sensor 3 if the second sensor is enabled (for example if the output of the second sensor 3 was used to determine the traffic density at step S302). The process then proceeds to step S308.

At step S308, the control module 5 is configured to transmit a control signal to enable the first sensor 2 if the first sensor 2 is disabled and uses the signal output from the first sensor 2 to detect motion of objects. The control module 5 is configured to use the motion detection to determine the traffic density by counting the number of detected objects that have passed through the environment of the lighting system 100 within a predetermined time period. The process then proceeds back to step S304.

If the control module 5 determines at step S304 that there is low traffic density then the process 300 proceeds to step S310.

At step S310, the control module 5 is configured to transmit a control signal to enable the second sensor 3 if the second sensor is disabled (for example if the output of the first sensor 2 was used to determine the traffic density at step S302, or if the second sensor was disabled at step S306). At step S310, the control module 5 may also transmit a control signal to disable the first sensor 2 if the first sensor 2 is enabled.

At step S312 the control module 5 uses the signal output from the second sensor 3 to detect motion of objects. The control module 5 is configured to use the motion detection to determine the traffic density by counting the number of detected objects that have passed through the environment of the lighting system 100 within a predetermined time period.

In embodiments of the present disclosure, the control module 5 may alternate between enabling one of the first sensor 2 and second sensor 3 and disabling the other in dependence on the traffic density of objects passing through the environment of the lighting system 100 (determined at step S304), such that the output of only one sensor is used to perform motion detection. In other embodiments, the control module 5 may additionally use the output of the first sensor 2, to complement/verify the motion detection of the second sensor 3—this is shown in FIG. 3 as optional step S314 (indicated by the dashed lines).

Following step S312 (or step S314 if verification using the first sensor 2 is implemented) the process 300 then proceeds back to step S304.

Figure 4:
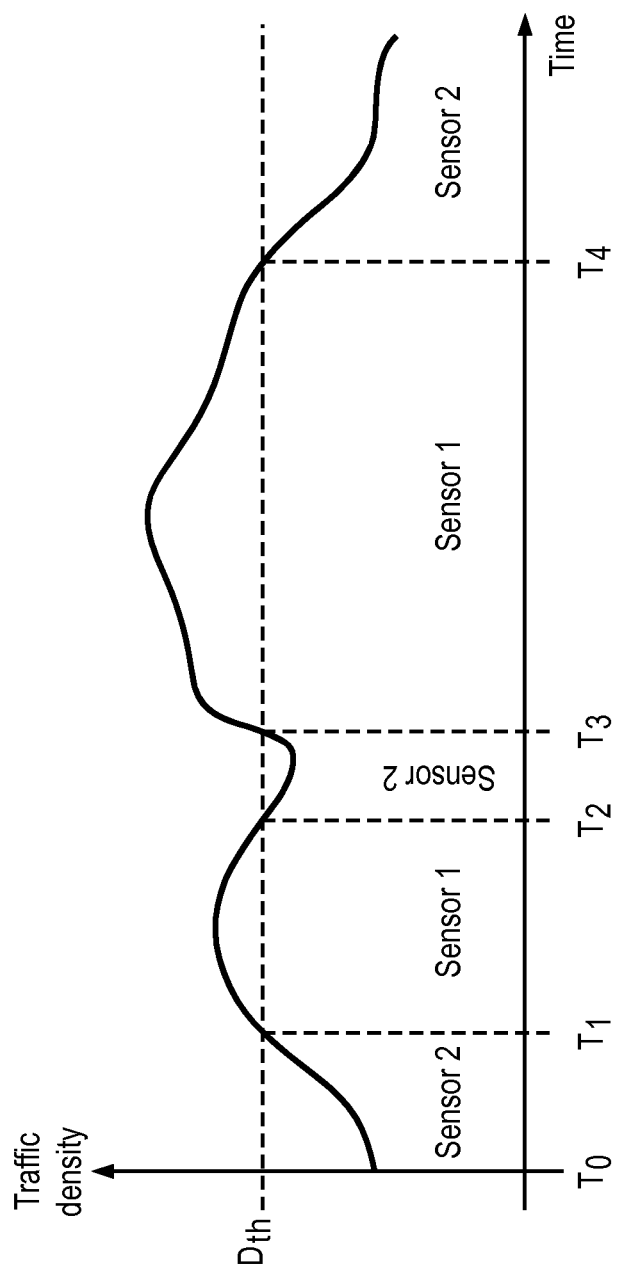
FIG. 4 illustrates switching between first and second sensors in dependence on traffic density.

Reference is now made to FIG. 4, which illustrates switching between the first sensor 2 and the second sensor 3 in dependence on traffic density in accordance with the process 300 described above.

FIG. 4 is described with reference to the embodiment described above in which the control module 5 determines whether there is a high traffic density of objects at step S304 based on a measured number of detected objects that have passed through the environment of the lighting system 100 within a predetermined time period (rather than based on time of day information). Between time $T_0$ and $T_1$ the determined traffic density is less than the predetermined threshold traffic density threshold, $D_{th}$, and therefore the output of the second sensor 3 is used by the control module 5 to detect motion of objects to determine the traffic density (at step S312) by counting the number of detected objects that have passed through the environment of the lighting system 100 within a predetermined time period.

At time $T_1$ the control module 5 determines at step S304 that the traffic density (measured using the output of the second sensor 3) has reached the threshold traffic density, $D_{th}$, and the control module 5 disables the second sensor 3 at step S306 and enables the first sensor 2 at step S308.

The control module 5 is configured to use the signal output from the first sensor 2 to detect motion of objects and determine the traffic density by counting the number of detected objects that have passed through the environment of the lighting system 100 within the predetermined time period. Between $T_1$ and $T_2$ the determined traffic density is equal to or greater than the predetermined threshold traffic density threshold, $D_{th}$.

At time $T_2$ the control module 5 determines at step S304 that the traffic density (measured using the output of the first sensor 2) has fallen below the threshold traffic density, $D_{th}$. In response to his determination the control module 5 enables the second sensor 3 at step S310.

The control module 5 is configured to use the signal output from the second sensor 3 to detect motion of objects and determine the traffic density by counting the number of detected objects that have passed through the environment of the lighting system 100 within a predetermined time period. Between $T_2$ and $T_3$ the determined traffic density is less than the predetermined threshold traffic density threshold, $D_{th}$.

At time $T_3$ the control module 5 determines at step S304 that the traffic density (measured using the output of the second sensor 3) has reached the threshold traffic density, $D_{th}$, and the control module 5 disables the second sensor 3 at step S306 and enables the first sensor 2 at step S308.

The control module 5 is configured to use the signal output from the first sensor 2 to detect motion of objects and determine the traffic density by counting the number of detected objects that have passed through the environment of the lighting system 100 within the predetermined time period. Between $T_3$ and $T_4$ the determined traffic density is equal to or greater than the predetermined threshold traffic density threshold, $D_{th}$.

At time $T_4$ the control module 5 determines at step S304 that the traffic density (measured using the output of the first sensor 2) has fallen below the threshold traffic density, $D_{th}$. In response to his determination the control module 5 enables the second sensor 3 at step S310.

The lighting system 100 continues in this manner switching between using the first sensor 2 and the second sensor 3 in dependence on the traffic density. This alternating activation may continue indefinitely, or both sensors may be enabled (or disabled) concurrently at one or more times during the course of a day.

Whilst FIG. 4 has been described with reference to the control module 5 actively monitoring the traffic density to make the determination at step S304, it will be appreciated that the switching between using the first sensor 2 and the second sensor 3 may alternatively be based on time-based scheduling information where it is assumed that higher traffic density is observed in one or more time periods, and that lower traffic density is observed in one or more other time periods.

The sensor switching strategy employed by embodiments of the present disclosure ensure that when there is a low performance requirement (i.e. when traffic density is high, the false-triggers etc. which are associated with less-accurate sensors have little or no negative effect on the lighting system 100) the less accurate first sensor 2 is used for motion detection, and upon an increase in the requirement of performance robustness (i.e. when traffic density is low, false-triggers may cause luminaires to dim-up unnecessarily) the more accurate second sensor 3 is used for motion detection. By only enabling the higher power consuming second sensor 3 when there is low traffic density, power consumption of the lighting system 100 is reduced.

By optimally choosing the selection strategy of sensors in a multi-modal sensor infrastructure, a cost-efficient and robust sensing solution can be achieved in accordance with embodiments of the present disclosure.

Whilst embodiments have been described above with reference to the different sensing modalities of the lighting system 100 being provided by separate sensor units (i.e. the first sensor 2 and the second sensor 3), embodiments of the present disclosure also extend to a single sensor scenario.

In the single sensor scenario, the single sensor is configured to operate according to different sensor modalities.

For example, the single sensor may be a time of flight sensor comprising a time-of-flight sensing element. The time-of-flight sensing element is able to sense radiation emitted from an emitter, and this sensing is synchronised with the emission of the radiation from the emitter. The emitter may be a dedicated emitter which may be part of the time of flight sensor. In this case the emitted radiation may be radiation other than visible light, e.g. infrared, RF or ultrasound, in order not to intrude upon or be confused with the visible light in the environment of the lighting system 100; or the radiation could be visible light modulated with an identifiable signal to distinguish it from the rest of the light in the environment of the lighting system 100. Alternatively the radiation used in the time-of-flight sensing may be from the luminaire(s) 4 which are already emitting visible light into the environment of the lighting system 100 for the purpose of illumination.

Some of the emitted radiation will be reflected from an object back towards the time of flight sensor. As it is synchronised with the emission, the time of flight sensor can be used to determine the amount of time between emission from the emitter and reception back at the sensing element, i.e. time-of-flight information. Further, the sensing element takes the form of a two-dimensional pixel array, and is able to associate a time-of-flight measurement with a measurement of the radiation captured by some or all of the individual pixels. Thus the time-of-flight sensor is operable to capture a depth-aware or three-dimensional image in its SR, including a detected object. In the case where the sensing element captures visible light, the time-of-flight sensor may also be referred to as a depth-aware or 3D camera. By applying image recognition to the depth-aware or 3D images captured by the time of flight sensor, it is possible to detect information such as the location of a detected object in the environment of the lighting system 100, and the direction in which the object is facing. Details of time-of-flight based image sensing in themselves will be familiar to a person skilled in the art, and are not described in any further detail herein.

In a first operating mode, the time-of-flight sensor operates as a traditional passive image sensor and does not perform time-of-flight based image sensing. In a second operating mode, the time-of-flight sensor operates to perform active time-of-flight based image sensing as described above. When operating in the second operating mode, the time of flight sensor (and the luminaire(s) 4 if the radiation used in the time-of-flight sensing is emitted from the luminaire(s) 4) consumes more power than when the time of flight sensor operates in the first operating mode. Thus, the time-of-flight sensor has different power consumption and motion detection characteristics according to its operating mode.

The operating mode of the time-of-flight sensor is controlled by the control module 5.

During periods of higher traffic density, at step S306 the control module 5 disables the time-of-flight based image sensing (if enabled) and controls the time-of-flight sensor to operate in the first operating mode i.e. as a traditional passive image sensor to detect motion of objects, at step S308. Thus during periods of higher traffic density the time-of-flight single sensor is configured to operate as the first sensor 2.

During periods of lower traffic density, at step S310 the control module 5 enables the time-of-flight based image sensing (if disabled) and performs motion detection based on the time-of-flight based image sensing information received from the time of flight sensor (at step S312). Thus during periods of lower traffic density the single time-of-flight sensor is configured to operate as the second sensor 3.

In the single sensor scenario, optional step S314 is not implemented.

Whilst the single sensor scenario has been described above with reference to a time of flight sensor, the single sensor may be any sensor which has the ability to operating in different operating modes which have different power consumption and motion detection characteristics according to its operating mode.

In embodiments of the present disclosure, the control module 5 is configured to control the illumination level of the light emitted from the luminaire(s) 4 based on the traffic density determined based on the output from the first sensor 2 and/or the second sensor 3. Reference to an "illumination level" used herein refers to the amount of light output from the luminaire(s) 4. The illumination level can be expressed in terms of illuminance (in lux) i.e. in terms of the amount of light emitted from the luminaire(s) 4 that is incident over a plane of interest (e.g. a road surface).

The particular lighting strategy used by the control module 5 can be configured according to the application of the lighting system 100. For example, the control module 5 may be configured to implement proportional illumination control based on the determined traffic density, i.e. increase the illumination level of the light emitted from the luminaire(s) 4 as the traffic density increases, and decrease the illumination level of the light emitted from the luminaire(s) 4 as the traffic density decreases. This allows the lighting system 100 to reduce its energy consumption by dimming down the illumination level of the light emitted from the luminaire(s) 4.

The embodiments described above can be used for the detection of any object, for example vehicles, cyclists and/or pedestrians.

Although the above description refers to an outdoor lighting environment, in particular an outdoor street light. Principles of the present disclosure may be applied to other outdoor lighting applications. Furthermore, principles of the present disclosure are not limited to outdoor lighting environments, and may also be applied to indoor lighting environments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller comprising:
   an output for controlling one or more lighting device to illuminate an environment;
   an input for receiving a signal output from a sensor of a first type and a signal output from a sensor of a second type, wherein the sensor of the second type consumes more power than the sensor of the first type; and
   a control module configured to detect motion of objects in said environment in response to receiving at least one of said signals, and control the one or more lighting device based on detected motion of objects in said environment, wherein the signal output from the sensor of the second type provides more accurate motion detection than the signal output from the sensor of the first type; and wherein the control module is configured to disable the sensor of the second type, and use the signal received from the sensor of the first type to detect motion of objects in said environment when higher traffic density of objects passing through said environment occurs, and use the signal received from at least the sensor of the second type to detect motion of objects in said environment when lower traffic density of objects passing through said environment occurs.

2. The controller according to claim 1, wherein the control module is configured to dynamically determine the traffic density of objects passing through said environment.

3. The controller according to claim 1 wherein the control module is configured to use the signal received from only the sensor of the second type to detect motion of objects in said environment when lower traffic density of objects passing through said environment occurs.

4. The controller according to claim 1, wherein when lower traffic density of objects passing through said environment occurs, the control module is configured to use the signal received from the sensor of the second type to detect motion of objects in said environment, and use the signal received from the sensor of the first type to verify the detection of the sensor of the second type.

5. The controller according to claim 1, wherein the control module is configured to determine the traffic density of objects passing through said environment based on a count of a number of the objects detected within a predetermined time period.

6. The controller according to claim 5, wherein the control module is configured to:
determine when higher traffic density of objects passing through said environment occurs when said count is equal to, or greater than, a predetermined traffic density threshold; and
determine when lower traffic density of objects passing through said environment occurs when said count is less than the predetermined traffic density threshold.

7. The controller according to claim 1, wherein the control module is configured to determine when higher traffic density and lower traffic density of objects passing through said environment occurs based on received time of day information.

8. The controller according to claim 5, wherein the control module is configured to control an illumination level of light emitted from the one or more lighting device in dependence on the determined traffic density.

9. The controller according to claim 8, wherein the control module is configured to proportionally control the illumination level of light emitted from the one or more lighting device in dependence on the determined traffic density.

10. A lighting system comprising:
the controller according to any preceding claim;
at least one sensor; and
the one or more lighting device.

11. The lighting system according to claim 10, the at least one sensor comprising a first sensor of the first type and a second sensor of the second type, wherein the first and second sensor are separate sensor units.

12. The lighting system according to claim 11, wherein the first sensor comprises at least one Passive Infra-Red sensor and the second sensor comprises at least one image sensor.

13. The lighting system according to claim 10, the at least one sensor comprising a single sensor, the single sensor configured to switch between operating as the sensor of the first type and the sensor of the second type in dependence on its operating mode.

14. The lighting system according to claim 13, the single sensor comprising a time of flight sensor, wherein the time of flight sensor is configured to operate as the sensor of the first type in a first operating mode wherein the time of flight sensor performs passive image sensing, and operate as the sensor of the second type in a second operating mode wherein the time of flight sensor performs active time-of-flight based image sensing.

15. A computer program product for performing sensing using a signal output from a sensor of a first type and a signal output from a sensor of a second type to control one or more lighting device to illuminate an environment, the computer program product comprising code embodied on a computer-readable medium and being configured so as when executed on a processor to:
detect motion of objects in said environment in response to receiving at least one of said signals, and control the one or more lighting device based on detected motion of objects in said environment, wherein the signal output from the sensor of the second type provides more accurate motion detection than the signal output from the sensor of the first type;
disable the sensor of the second type, and use the signal received from the sensor of the first type to detect motion of objects in said environment when higher traffic density of objects passing through said environment occurs; and
use the signal received from at least the sensor of the second type to detect motion of objects in said environment when lower traffic density of objects passing through said environment occurs.

\* \* \* \* \*